United States Patent [19]

Kasai et al.

[11] Patent Number: 5,109,052
[45] Date of Patent: Apr. 28, 1992

[54] THERMOPLASTIC RESIN COMPOSITION

[75] Inventors: Koji Kasai, Yokohama; Masami Tsunetani, Ebina, both of Japan

[73] Assignee: Asahi Kasei Kogyo Kabushiki Kaisha, Osaka, Japan

[21] Appl. No.: 727,350

[22] Filed: Jul. 8, 1991

Related U.S. Application Data

[62] Division of Ser. No. 233,613, filed as PCT/JP88/00624, Jun. 23, 1988, abandoned.

[30] Foreign Application Priority Data

Jun. 25, 1987 [JP] Japan .................. 62-156581
Jun. 26, 1987 [JP] Japan .................. 62-159098

[51] Int. Cl.$^5$ .............. C08L 53/02; C08L 77/00; C08K 5/01
[52] U.S. Cl. ....................... 524/505; 524/62; 524/65; 525/66; 525/89; 525/92
[58] Field of Search .......... 525/92, 89; 524/505, 524/62, 65

[56] References Cited

U.S. PATENT DOCUMENTS

| | | | |
|---|---|---|---|
| 3,379,792 | 4/1968 | Finholt | 525/397 |
| 4,085,163 | 4/1978 | Gergen et al. | 525/92 |
| 4,315,086 | 2/1982 | Ueno et al. | 525/391 |
| 4,338,421 | 7/1982 | Maruyama et al. | 525/397 |
| 4,339,376 | 7/1982 | Kasahara et al. | 524/116 |
| 4,600,741 | 7/1986 | Aycock et al. | 525/132 |
| 4,628,072 | 12/1986 | Shiraki et al. | 525/95 |
| 4,772,657 | 9/1988 | Akiyama et al. | 525/92 |
| 4,772,664 | 9/1988 | Ueda et al. | 525/92 |
| 4,839,425 | 6/1989 | Mawatori et al. | 525/66 |

FOREIGN PATENT DOCUMENTS 62-273254 3/1987 Japan .
62-81449 4/1987 Japan .
63-10656 5/1988 Japan .

Primary Examiner—Ana L. Carrillo
Attorney, Agent, or Firm—Armstrong & Kubovcik

[57] ABSTRACT

A novel thermoplastic resin composition is disclosed, which comprises a polyphenylene ether, a polyamide and a specific block copolymer as main components and has a specific dispersion morphology such that the polyamide forms a continuous phase in which the polyphenylene ether is dispersed and the block copolymer is micro-dispersed in the dispersed phase of the polyphenylene ether. The composition of the present invention has an excellent balance of thermal stability, heat distortion resistance, impact resistance, oil resistance, stiffness, etc., and, hence, is useful as an engineering material in the fields of automobiles, electric and electronic industries.

8 Claims, No Drawings

THERMOPLASTIC RESIN COMPOSITION

This application is a division of application Ser. No. 233,613 filed Jul. 14, 1988, now abandoned.

DESCRIPTION

1. Technical Field

The present invention relates to a novel thermoplastic resin composition. More particularly, the present invention is concerned with a thermoplastic resin composition comprising a polyamide, a polyphenylene ether (hereinafter often referred to simply as "PPE") and, as a third component, either a hydrogenated block copolymer consisting essentially of at least one vinyl aromatic polymer block comprised mainly of vinyl aromatic compound units and at least one olefin polymer block comprised mainly of olefin compound units, which olefin polymer block has an ethylenic unsaturation degree of not greater than 20%, or a mixture of the above-mentioned hydrogenated block copolymer with a diene block copolymer consisting essentially of at least one vinyl aromatic polymer block comprised mainly of vinyl aromatic compound units and at least one diene polymer block comprised mainly of conjugated diene compound units, and wherein these three components form a blend with a unique dispersion morphology. This composition exhibits excellent thermal stability, and has an excellent balance of heat distortion resistance, impact resistance, oil resistance, stiffness, etc. This composition can be advantageously used as an engineering material in the automobile, electrical and electronic industries.

2. Background Art

Polyamide resins have excellent mechanical strength, oil resistance, abrasion resistance, thermal resistance, etc., and have been utilized in large quantities as one of the most typical engineering plastics. However, polyamide resins have the disadvantage of being inferior to other plastics with respect to the properties of dimensional stability, insusceptibility to moisture absorption, heat distortion resistance under a high load, impact resistance in the dry state, etc.

On the other hand, polyphenylene ether resins have excellent dimensional stability, electrical properties, heat distortion resistance under a high load, water resistance, etc. The resins are widely utilized in the form of a blend with a polystyrene resin for commercial uses. Polyphenylene ether resins, however, have the severe disadvantages of being inferior to other plastics in oil resistance and molding flow properties.

Accordingly, blending of both of these resins has been attempted in order to attain effective utilization of the desired properties inherent in both of the resins and to compensate for the disadvantages of the resins. In accordance with such attempts, various compositions have been proposed. For example, a resin blend obtained by simply blending, in particular, melt blending, both of the resins has been proposed (see U.S. Pat. No. 3,379,792 and U.S. Pat. No. 4,338,421). However, the compatibility between polyphenylene ether and polyamide resins is inherently poor. Therefore, a molded article having excellent mechanical strength cannot be obtained by simple blending as proposed.

Another composition has been proposed which is obtained by melt kneading a polyamide, a polyphenylene ether and, as a third component, a compound having in the molecule thereof (a) a carbon-carbon double bond or triple bond and (b) a functional group such as a carboxyl group or an acid anhydride group, such a compound being added to improve the compatibility between the polymers, or is obtained by further adding to the resultant modified polymer composition a rubber-like substance (see U.S. Pat. No. 4,315,086). However, such a composition is still unsatisfactory in impact strength. Moreover, since the thermal stability of the composition is poor, the composition has the disadvantage that its impact strength is further markedly lowered during residence in a molding machine.

Also known in the art is a composition obtained by adding, as a compatibilizing agent, a copolymer of a styrene compound and an $\alpha,\beta$-unsaturated dicarboxylic anhydride to a polyphenylene ether and a polyamide, and further adding to the resultant composition a rubber-like substance as an impact resistance improver, for which reference may be made to U.S. Pat. No. 4,339,376. However, in the specification of this patent, there is only a collective disclosure of a number of different substances as the rubber-like substance. There is no disclosure with respect to the morphology and particle size of the polyphenylene ether, polyamide and elastomeric components. Moreover, the physical properties of the compositions disclosed in this patent are not always satisfactory.

A further composition is known in the art, which comprises a resin blend of a hydrogenated block copolymer comprised of specific monoalkenylarene compound units and specific conjugated diene compound units having 80% or more of the double bonds thereof hydrogenated, a polyamide and a poly(arylene ether). At least two members of these polymers form a continuous interpenetrated network structure in which the individual phases are at least partially entangled with each other (see U.S. Pat. No. 4,085,163). This resin blend has a morphology definitely different from that of the composition of the present invention as described below. Further, the resin blend does not always exhibit desirably improved impact resistance, heat resistance, stiffness, etc.

A still further resin composition comprising a polyamide, a polyphenylene ether, a polyphenylene ether modified with an acyl group and a styrene-ethylene/butylene rubber is disclosed in U.S. Pat. No. 4,600,741. However, in the specification of this patent, there is no disclosure with respect to the morphology and particle size of the polyphenylene ether, polyamide and elastomeric components. Moreover, the composition of this patent does not have a desired balance between mechanical properties and moldability.

A still further composition of a multi-phase structure comprising an aliphatic polyamide, a polyphenylene ether and a styrene-butylene/ethylene-styrene elastomer has been proposed (see Japanese Patent Application Laid-Open Specification No. 62-273254). In the specification of this publication, however, there is only a general description with respect to the vinyl aromatic compound content of and the solution viscosity of the elastomer which is a hydrogenated block copolymer. There is no suggestion with respect to the feature of the present invention that only when the vinyl aromatic compound content and molecular weight of the hydrogenated block copolymer are in specific ranges, is a unique dispersion structure characteristic realized, thereby enabling the physical properties of the composition to be improved. Moreover, the improvement in impact resistance and stiffness is not sufficient in this composition.

DISCLOSURE OF THE APPLICATION

As apparent from the foregoing, all of the known compositions comprising a polyamide and a polyphenylene ether have some disadvantage in physical properties. Until now, a resin composition which is excellent in all of the properties of impact resistance, heat distortion resistance and stiffness and has an excellent balance of physical properties, has not been realized.

In most cases, the resin compositions are melted in a molding machine, molded, and put into practical use. Consequently, it is extremely important from an industrial point of view to develop a resin composition having a thermal stability which ensures that the properties of the resin composition, especially impact resistance, are not lowered during residence of the composition in a molding machine.

The present inventors have made extensive and intensive studies with a view toward developing a thermoplastic resin composition which is excellent in thermal stability as mentioned above and has an excellent balance of properties. As a result, the present inventors have found that this object can be attained by a composition comprising specific proportion of a polyamide, a polyphenylene ether and, as a reinforcing agent, either a specific hydrogenated block copolymer or a mixture of a specific hydrogenated block copolymer with a diene block copolymer, the composition having a specific dispersion morphology with respect to these components. The present invention has been accomplished on the basis of this novel finding.

It is, therefore, an object of the present invention to provide a thermoplastic resin composition based on a resin blend of a polyamide and a polyphenylene ether, which composition exhibits excellent thermal stability and has an excellent balance of various properties, such as heat distortion resistance, impact resistance, oil resistance, stiffness, etc.

The foregoing and other objects, features and advantages of the present invention will be apparent from the following detailed description and appended claims.

According to the present invention, there is provided a thermoplastic resin composition comprising:

(A) a polyphenylene ether,
(B) a polyamide, and
(C) a block copolymer selected from the group consisting of (1) a hydrogenated block copolymer (α) and (2) a mixture of a hydrogenated block copolymer (α) with a diene block copolymer (β), the hydrogenated block copolymer (α) consisting essentially of at least one vinyl aromatic polymer block comprised mainly of vinyl aromatic compound units and at least one olefin polymer block comprised mainly of olefin compound units, said olefin polymer block having an ethylenic unsaturation degree of not greater than 20%, the hydrogenated block copolymer (α) having a vinyl aromatic compound content of from 25 to 85% by weight and a number average molecular weight of not greater than 300,000, the diene block copolymer (β) consisting essentially of at least one vinyl aromatic polymer block comprised mainly of vinyl aromatic compound units and at least one diene polymer block comprised mainly of conjugated diene compound units, the diene block copolymer (β) having a vinyl aromatic compound content of from 25 to 85% by weight.

The components (A), (B) and (C) are present in amounts of from 25 to 70% by weight, from 25 to 70% by weight, and from 2 to 25% by weight, respectively, based on the weight of the total of the components (A), (B) and (C).

The weight ratio of said diene block copolymer (β) to the hydrogenated block copolymer (α) in the mixture of the components (α) and (β) is from 2/8 to 8/2.

In the thermoplastic resin composition of the present invention the polyamide component (B) is present as a continuous phase in which the polyphenylene ether component (A) is dispersed to form a dispersed phase having an average dispersed particle size of from 0.1 to 10 μm, and substantially all of the block copolymer component (C) is micro-dispersed in the dispersed phase of the polyphenylene ether component (A).

In the composition of the present invention, the polyamide component (B) is present as a continuous phase, in which the polyphenylene ether component (A) is dispersed to form a dispersed phase. Further, substantially all of the block copolymer component (C) is micro-dispersed in the above-mentioned dispersed phase. Therefore, the present composition having a dispersion structure as set forth above is structurally different from conventional compositions, e.g., that of U.S. Pat. No. 4,085,163 in which a partially continuous interpenetrated network structure is formed.

The polyphenylene ether which is used as component (A) of the composition of the present invention, is selected from a homopolymer comprising a recurring unit represented by the general formula:

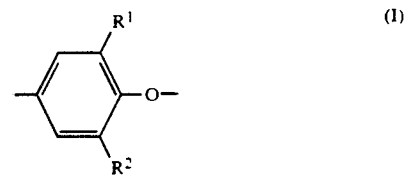

(I)

(wherein $R^1$ and $R^2$ are each independently a straight chain, or branched primary or secondary alkyl, hydroxyalkyl or haloalkyl group having 1 to 4 carbon atoms, an aryl group, a halogen atom or a hydrogen atom provided that $R^1$ and $R^2$ are not concurrently a hydrogen atom);

a copolymer comprising a recurring unit represented by the above-mentioned formula (I) and a recurring unit represented by the general formula:

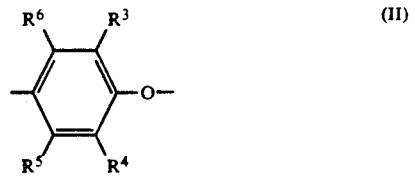

(II)

(wherein $R^3$, $R^4$, $R^5$ and $R^6$ are each independently a straight chain, or branched primary or secondary alkyl, hydroxyalkyl or haloalkyl group having 1 to 4 carbon atoms, an aryl group, a halogen atom or a hydrogen atom provided that $R^3$ and $R^4$ are not concurrently a hydrogen atom);

a graft copolymer comprising the above-mentioned homopolymer or copolymer and, grafted thereon, styrene; and the like.

Examples of useful polyphenylene ether homopolymers include poly(2,6-dimethyl-1,4-phenylene)ether; poly(2-methyl-6-ethyl-1,4-phenylene)ether; poly(2,6-diethyl-1,4-phenylene)ether; poly(2-ethyl-6-n-propyl-1,4-phenylene)ether; poly(2,6-di-n-propyl-1,4-phenylene)ether; poly(2-methyl-6-n-butyl-1,4-phenylene)ether; poly(2-ethyl-6-isopropyl-1,4-phenylene)ether; poly(2-methyl-6-chloro-1,4-phenylene)ether; poly(2-methyl-6-hydroxyethyl-1,4-phenylene)ether; poly(2-methyl-6-chloroethyl-1,4-phenylene)ether; and the like.

Examples of polyphenylene ether copolymers include a polyphenylene ether copolymer which is obtained by copolymerizing 2,6-dimethylphenol with o-cresol or an alkyl-substituted phenol, e.g., 2,3,6-trimethylphenol, represented by the general formula:

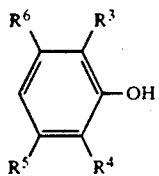

(III)

(wherein $R^3$, $R^4$, $R^5$ and $R^6$ have the same meanings as described above).

In the case of either the homopolymer or copolymer, a polyphenylene ether having a polymerization degree of 0.30 to 1.5, preferably 0.4 to 1.0 in terms of the intrinsic viscosity $[\eta]$(chloroform solution, 30° C.) is used.

As the polyamide which is useful as component (B) of the composition of the present invention, any polyamide can be used as long as it has

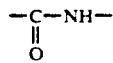

bonds in its main chain and is capable of melting when heated.

Examples of useful polyamides include polytetramethylene adipamide (nylon 46); polycaproamide (nylon 6); polyhexamethylene adipamide (nylon 66); polyhexamethylene sebacamide (nylon 610); polyhexamethylene dodecamide (nylon 612); polyundecanamide (nylon 11); polydodecanamide (nylon 12); a polyamide obtained by reacting terephthalic acid with hexamethylenediamine; a polyamide obtained by reacting adipic acid with m-xylylenediamine; a semiaromatic polyamide obtained by reacting terephthalic acid, adipic acid and hexamethylenediamine; a copolyamide comprising at least two different polyamide units of the above-mentioned polyamides; and mixtures thereof. Among the polyamides, nylon 6, nylon 66, nylon 610, a copolymer of nylon 6 and nylon 66 and a semiaromatic polyamide obtained by reacting terephthalic acid, adipic acid and hexamethylene diamine are most preferred. Further, a polyamide having a polymerization degree of 2.0 to 6.0, preferably 2.3 to 4.5, in terms of the relative viscosity $\eta_r$ (1 w/v %, 95.5% by weight sulfuric acid solution, 25° C.) is used.

It is necessary that the block copolymer which is used as component (C) of the composition of the present invention be substantially micro-dispersed in the polyphenylene ether phase which is present as a dispersed phase in the composition. Accordingly, it is necessary that the block copolymer (C) be a rubber-like substance having a higher affinity to the polyphenylene ether than to the polyamide.

The block copolymer which is used as component (C) of the composition of the present invention is selected from (1) a hydrogenated block copolymer ($\alpha$) and (2) a mixture of the hydrogenated block copolymer ($\alpha$) with a diene block copolymer ($\beta$).

The hydrogenated block copolymer ($\alpha$) (hereinafter often referred to as "block HTR") consists essentially of at least one vinyl aromatic polymer block comprised mainly of vinyl aromatic compound units and at least one olefin polymer block comprised mainly of olefin compound units. The olefin polymer block has an ethylenic unsaturation degree of not greater than 20%. The hydrogenated block copolymer has a vinyl aromatic compound content of from 25 to 85% by weight and a number average molecular weight of not greater than 300,000. More preferred is a hydrogenated block copolymer ($\alpha$) having a number average molecular weight of 45,000 to 300,000, of which the vinyl aromatic compound content and number average molecular weight satisfy the relationship:

$$M \geq 225,000 - (5,000 \times S)$$

wherein M is the number average molecular weight of the hydrogenated block copolymer ($\alpha$) and S is the vinyl aromatic compound content of the hydrogenated block copolymer ($\alpha$).

Most preferred is a hydrogenated block copolymer ($\alpha$) having a vinyl aromatic compound content of from 33 to 60% by weight and a number average molecular weight of from 50,000 to 200,000, of which the vinyl aromatic compound content and number average molecular weight satisfy the relationship:

$$M \geq 225,000 - (5,000 \times S)$$

wherein M is the number average molecular weight of the hydrogenated block copolymer ($\alpha$) and S is the vinyl aromatic compound content of the hydrogenated block copolymer ($\alpha$).

Examples of the vinyl aromatic compound units in the above-mentioned hydrogenated block copolymer include styrene units, $\alpha$-methylstyrene units, vinyltoluene units and the like. The above-mentioned vinyl aromatic compound units may be used alone. Alternatively, two or more types of the vinyl aromatic compound units may also be used in combination. Among the above-mentioned vinyl aromatic compound units, a styrene unit is most preferred. Examples of the olefin compound units include a monoolefin compound unit such as an ethylene unit, a propylene unit, a 1-butene unit and an isobutylene unit; a conjugated diene compound unit such as a butadiene unit, an isoprene unit and a 1,3-pentadiene unit; an unconjugated diene compound unit such as a 1,4-hexadiene unit, a norbornadiene unit and a norbornadiene derivative; and the like. The olefin compound unit may be used alone. Alternatively, two or more types of the olefin compound units may also be used in combination. However, it is necessary that the olefin polymer block comprised mainly of olefin compound units have an ethylenic unsaturation degree of not greater than 20%.

Therefore, in the case where a diene compound unit is used as the olefin compound unit, it is necessary to hydrogenate the olefin polymer block to such an extent that the ethylenic unsaturation degree of the polymer block does not exceed 20%. In the case where the ethylenic unsaturation degree of the above-mentioned olefin polymer is not greater than 20%, hydrogenation is not required. Accordingly, the terminology "hydrogenated block copolymer" used herein includes a block copolymer which is not hydrogenated but has an ethylenic unsaturation degree of not greater than 20%. When the ethylenic unsaturation degree exceeds 20%, the thermal stability of the composition is lowered so that when the composition is subjected to molding under severe temperature conditions, the impact strength of the product is markedly decreased.

As the olefin compound unit of the above-mentioned hydrogenated block copolymer ($\alpha$), a conjugated diene compound is preferred. Further, it is preferred that the content of the 1,2-vinyl bonds of the conjugated diene in the olefin compound unit be 20 to 60% by weight. When such a type of olefin compound unit is used, the olefin compound unit is hydrogenated so that the ethylenic unsaturation degree is not greater than 20%.

As a catalyst which may be used for the above-mentioned hydrogenation treatment, there are known, for example, (1) a carried type heterogeneous catalyst comprising a carrier such as carbon, silica, alumina and diatomaceous earth and, supported thereon, a metal such as Ni, Pt, Pd and Ru; and (2) a homogeneous catalyst such as the so-called Ziegler catalyst in which a salt of an organic acid or acetylacetone with Ni, Co, Fe, Ti, Cr or the like is used in combination with a reducing agent such as an organoaluminum compound, and such as the so-called organic acid catalyst such as a organometallic compound comprising Ru, Rh or the like.

In practice, the hydrogenated block copolymer ($\alpha$) to be used in the present invention can be produced by hydrogenating a block copolymer in an inert solvent in the presence of a hydrogenation catalyst according to a method such as that described in Japanese Patent Application Publication Nos. 42-8704 and 43-6636 and Japanese Patent Application Laid-Open Specification Nos. 59-133203 and 60-220147. In the hydrogenation, it is necessary that, for example, at least 80% of the aliphatic double bonds of the conjugated diene compound units of the vinyl aromatic compound-conjugated diene compound block copolymer be hydrogenated so that a polymer block comprised mainly of conjugated diene compound units is structurally converted to a polymer block comprised mainly of monoolefin compound units. With respect to the aromatic double bonds of the vinyl aromatic polymer block comprised mainly of vinyl aromatic compound units and with respect to the aromatic double bonds of the vinyl aromatic compound units which are occasionally bonded to the olefin polymer block comprised mainly of conjugated diene compound units due to irregular addition reactions which occur between the olefin polymer and the vinyl aromatic compound, the hydrogenation degree of the double bonds is not limited, but preferably is not greater than 20%. The amount of the unhydrogenated aliphatic double bonds contained in the hydrogenated block copolymer may be determined by analysis using an infrared spectrophotometer, a nuclear magnetic resonance spectrometer, etc.

The hydrogenated block copolymer ($\alpha$) of the component (C) may contain a rubber softener that is usually used for treatment of a rubber. It is particularly preferable to use rubber softeners which are compatible with the olefin polymer block. The rubber softener may be a mineral oil type rubber softener that is known as a process oil or an extender oil and that is generally used for softening a rubber, increasing the volume of a rubber and improving the workability of a rubber. Such a rubber softener is a mixture of a compound having an aromatic ring, a compound having a naphthene ring and a compound having a paraffin ring (see, for example, "Diana Process Oil", a pamphlet published by Idemitsu Kosan Co., Ltd., Japan or "Rubber Industry Handbook", p.284 to 285, published on Nov. 15, 1973 by The Society of Rubber Industry, Japan). Mineral oil type rubber softeners in which 50% or more of the total carbon atoms are accounted for by the carbon atoms of the paraffin chains are called "paraffin type", those in which the number of carbon atoms of the naphthene ring accounts for 30 to 45% of the total carbon atoms are called "naphthene type", and those in which the number of carbon atoms of the aromatic ring accounts for more than 30% of the total carbon atoms are called "aromatic type". With respect to the mineral oil type rubber softener to be used in the present invention, the rubber softeners of the paraffin type are preferred.

For producing the hydrogenated block copolymer containing a paraffin type rubber softener to be used in the present composition (hereinafter often referred to as "oil-extended block HTR"), there can be employed a customary method which is used for producing a resin composition or for producing a rubber composition. That is, production can be performed using a melt kneader such as a single-screw extruder, a twin-screw extruder, a Banbury mixer, a heating roll, Brabender mixer and various other kneaders. More specifically, in a preferred method, both of the components, i.e., the hydrogenated block copolymer ($\alpha$) and paraffin type rubber softener, are preliminarily mixed using a mixer such as a blender and then melt kneaded by means of a single-screw or twin-screw extruder.

When the hydrogenated block copolymer ($\alpha$) mixed with a rubber softener is employed, a marked improvement in impact resistance of the final composition is attained as compared with the case where a rubber softener is not used. The rubber softener is used in an amount of 10 to 100 parts by weight per 100 parts by weight of the component ($\alpha$). If the amount is less than 10 parts by weight, the intended effect is not obtained, while if it exceeds 100 parts by weight, undesirable effects such as a lowering in heat distortion resistance are likely to be caused.

In the above, the description is made with respect to the case where a hydrogenated block copolymer ($\alpha$) alone is used as the component (C). As mentioned above, however, in the present invention, a mixture of a hydrogenated block copolymer ($\alpha$) with a diene block copolymer ($\beta$) may also be used as the component (C). In this case, the same type of hydrogenated block copolymer ($\alpha$) as described above can be used.

In this embodiment, it is necessary that substantially all of the diene block copolymer to be used as the component ($\beta$) be micro-dispersed in the polyphenylene ether that is present as the dispersed phase. Therefore, the diene block copolymer needs to be a rubber-like material having stronger affinity to the polyphenylene ether than to the polyamide. As the diene block copolymer ($\beta$), there may be used a block copolymer consisting essentially of at least one vinyl aromatic polymer block comprised mainly of vinyl aromatic compound units and at least one diene polymer block comprised mainly of conjugated diene compound units, the block copolymer having a vinyl aromatic compound content of from 25 to 85% by weight. The content of the vinyl aromatic compound units is preferably in the range of from 30 to 70% by weight, more preferably in the range of from 35 to 60% by weight.

Examples of vinyl aromatic compound units of the diene block copolymer ($\beta$) include styrene units, $\alpha$-methylstyrene units and vinyltoluene units. These units may be present alone or in combination of two or more types of units. Of these, styrene units are particularly preferable. Examples of conjugated diene compound units include butadiene units, isoprene units and 1,3-pentadiene units. These units can be present alone or in combination of two or more types of units. Of these, butadiene units are particularly suitable.

The molecular structure of the diene block copolymer ($\beta$) is not particularly limited, and it may be of a straight chain, branched or radially extended configuration or of an optional combination thereof.

The number average molecular weight of the diene block copolymer is in the range of 50,000 to 200,000, preferably 60,000 to 100,000.

The proportion of the block copolymer component ($\beta$) is such that the total content of the component ($\alpha$) and the component ($\beta$), i.e., the content of the component (C), is in the range of from 2 to 25% by weight based on the weight of the total of the components (A), (B) and (C) and that the ratio of the component ($\beta$) to the component ($\alpha$) is in the range of from 2/8 to 8/2 (weight ratio). The total content of the component ($\alpha$) and the component ($\beta$) is preferably in the range of from 5 to 20% by weight based on the weight of the total of the components (A), (B) and (C), and the ratio of the component ($\beta$) to the component ($\alpha$) is preferably in the range of from 3/7 to 7/3 (weight ratio). If the weight ratio of the component ($\beta$) to the component ($\alpha$) is less than 2/8, improvement in weld-line strength is small while if it exceeds 8/2, thermal stability becomes poor.

In the composition of the present invention, when the component ($\beta$) is employed in combination with the component ($\alpha$), a practical mechanical strength such as weld-line strength, is greatly improved. In general, most of the injection-molded articles for practical use have weld-lines. In the present invention, "weld-line" means the line or surface along which a polymer must reunite and adhere to itself after flowing around an interference during molding. In the manufacture of a shaped article from thermoplastic compositions, the shaped articles, except those having an extremely simple configuration, are generally caused to have one or more weld-lines. In general, mechanical strength such as impact resistance of shaped articles is poorest at their weld-line portions and, hence, the practical strength of shaped articles is substantially determined by the mechanical strength at their weld-line portions.

In the composition of the present invention, when the component ($\beta$) is incorporated, the weld-line strength of the composition is markedly improved.

With respect to the proportions of the polyamide (B), polyphenylene ether (A) and block copolymer (C) in the composition of the present invention, the polyamide content is in the range of from 25 to 70% by weight, preferably 30 to 60% by weight; the polyphenylene ether content is in the range of from 25 to 70% by weight, preferably from 30 to 60% by weight; and the block copolymer content is in the range of from 2 to 25% by weight, preferably 5 to 20% by weight, based on the total weight of components (A), (B) and (C).

Further, with respect to the respective dispersion morphology of the components, it is necessary that the polyamide component (B) be present as a continuous phase in which the polyphenylene ether component (A) is dispersed so as to form a dispersed phase having an average dispersed particle size of from 0.1 to 10 $\mu$m, preferably 0.2 to 5 $\mu$m, and substantially all of the block copolymer component (C) is micro-dispersed in the dispersed phase of the polyphenylene ether component (A).

If the content of the polyamide component (B) is less than 25% by weight, based on the total weight of components (A), (B) and (C) or if the content of the polyphenylene ether component (A) exceeds 70% by weight, based on the total weight of components (A), (B) and (C), regardless of mixing conditions, there cannot be obtained a dispersion morphology such that the polyamide component (B) is present as a continuous phase and the polyphenylene ether component (A) is dispersed in the continuous phase of the polyamide component (B). On the other hand, if the content of the polyamide component (B) exceeds 70% by weight or if the content of the polyphenylene ether component (A) is less than 25% by weight, the composition becomes undesirably poor with respect to the heat distortion resistance under high load. The block copolymer (C) contributes to the improvement in the impact resistance, but if the content is less than 2% by weight, the impact resistance-improving effect is not obtained while if it exceeds 25% by weight, the mechanical strength of the composition is lowered.

As described above, with respect to the hydrogenated block copolymer ($\alpha$) to be employed as the block copolymer component (C) or as part of the component (C), if its vinyl aromatic compound content is less than 25% by weight and/or its number average molecular weight exceeds 300,000, the block copolymer (C) cannot be present as a micro-dispersed phase in the dispersed phase of the polyphenylene ether. Further, if the vinyl aromatic compound content exceeds 85% by weight, the reinforcing effect of rubber-like material is considerably lowered and, thus, a satisfactory impact strength cannot be attained. It is preferable that the hydrogenated block copolymer ($\alpha$) have a vinyl aromatic compound content of from 25 to 85% by weight and a number average molecular weight of from 45,000 to 300,000 which satisfy the above-mentioned relationship $M \geq 225,000 - (5,000 \times S)$.

Further, it is most preferred that the hydrogenated block copolymer ($\alpha$) have a vinyl aromatic compound content of from 33 to 60% by weight and a number average molecular weight of from 50,000 to 200,000 which satisfy the above-mentioned relationship $M \geq 225,000 - (5,000 \times S)$. When such a hydrogenated block copolymer ($\alpha$) is employed, there can be obtained a thermoplastic resin composition having a very excellent balance of mechanical properties, such as impact resistance and stiffness, and heat distortion resistance. The composition is further improved with respect to impact resistance at low temperatures.

If a thermoplastic resin composition has a dispersion morphology such that the polyamide forms a dispersed phase or both of the polyamide and the polyphenylene ether form dispersed phases, the resin composition is lowered with respect to oil resistance, heat resistance and stiffness. Further, if the polyphenylene ether forms a dispersed phase having an average dispersed particle size of less than 0.1 μm, the impact resistance and flowability at the time of molding of resin composition are lowered, while if the average dispersed particle size exceeds 10 μm, it becomes difficult for the polyphenylene ether to form a stable dispersed phase under severe molding conditions. Moreover, if a large amount of the block copolymer (C) is present in the polyamide phase in an independent form from the polyphenylene ether phase, the heat distortion resistance and stiffness of the composition are markedly lowered.

The addition of a small amount of a modified block copolymer (D) to the composition of the present invention improves not only a balance of mechanical strengths such as impact strength and stiffness, but also impact strength at low temperatures (for example, at −30 ° C.). As is well known, an excellent impact strength at low temperatures is advantageous for use of the composition as a material for the external trims of automobiles.

The modified block copolymer to be used as the component (D) is a block copolymer which is obtained by modifying an unmodified base block copolymer consisting essentially of at least one vinyl aromatic polymer block comprised mainly of vinyl aromatic compound units and at least one diene polymer block comprised mainly of conjugated diene compound units with at least one monomer selected from an unsaturated dicarboxylic acid or a compound derived therefrom so that the residual unit of the monomer is grafted on the base block copolymer in an amount of from 0.05 to 5 parts by weight per 100 parts by weight of the base block copolymer.

The base block copolymer consists essentially of at least one, preferably at least two vinyl aromatic polymer blocks each comprised mainly of vinyl aromatic compound units and at least one diene polymer block comprised mainly of conjugated diene compound units. It is necessary that the base block copolymer have a vinyl aromatic compound content of from 60 to 97% by weight.

Examples of vinyl aromatic compound units in the above-mentioned base block copolymer include styrene units, α-methylstyrene units, vinyltoluene units and the like. The above-mentioned vinyl aromatic compound units may be used alone. Alternatively, two or more types of the vinyl aromatic compound units may also be used in combination. Among the above-mentioned vinyl aromatic compound units, a styrene unit is most preferred. Examples of conjugated diene compound units include butadiene units, isoprene units and 1,3-pentadiene units. The conjugated diene compound units may be used alone. Alternatively, two or more types of conjugated diene compound units may also be used in combination. Among them, a butadiene unit is most preferred.

The molecular structure of the base block copolymer is not limited. For example, the base block copolymer may have a straight chain structure, a branched structure, a radially extended structure or a combination thereof. Further, two or more types of base block copolymers may be used in combination as long as the average vinyl aromatic compound content is within the above-mentioned range.

As the modified block copolymer (D) which is useful in the present invention, a modified block copolymer obtained by grafting an unsaturated dicarboxylic acid or its derivative on the conjugated diene compound units of the above-mentioned base block copolymer is preferred.

Examples of unsaturated dicarboxylic acids and their derivatives include maleic acid, fumaric acid, chloromaleic acid, itaconic acid, cis-4-cyclohexene-1,2-dicarboxylic acid, and anhydrides, esters, semialkyl esters, amides and imides thereof. Among these, particularly preferred are $\alpha,\beta$-unsaturated dicarboxylic acids and their derivatives, such as maleic acid and maleic anhydride.

The above-mentioned unsaturated dicarboxylic acids or their derivatives may be used alone or in combination.

The role of the component (D), i.e., modified block copolymer, is to promote micro-dispersion of the component (C), i.e., block copolymer, in the polyphenylene ether (A), and promote fine dispersion of the polyphenylene ether phase in the continuous phase of the polyamide (B). Such a unique dispersion morphology promoting action of the modified block copolymer (D) is apparent from the following fact. That is, it is seen from the results of observation by means of an electron microscope that when a small amount of the component (D) is added to a composition not containing the component (D) in which the block copolymer of the component (C) is not fully micro-dispersed in the dispersed phase of the polyphenylene ether but is present in aggregated form, a desired dispersion morphology is obtained. Moreover, where the modified block copolymer (D) is present in the composition has not yet been elucidated. However, from the action and effect of the modified block copolymer as mentioned above, it is believed that it is present in the polyphenylene ether phase.

The modified block copolymer is generally added to the composition in an amount of from 0.5 to 15 parts by weight, preferably 1 to 5 parts by weight, per 100 parts by weight of the total of the components (A), (B) and (C).

When the amount of the modified block copolymer (D) is less than 0.5 part by weight per 100 parts by weight of the total of components (A), (B) and (C), the impact resistance-improving effect of the copolymer is not appreciable. On the other hand, when the amount exceeds 15 parts by weight, the heat distortion resistance of the composition is lowered.

When the base block copolymer of the modified block copolymer (D) has a vinyl aromatic compound content of less than 60% by weight, the modified block copolymer does not exhibit any significant dispersion morphology-promoting effect. On the other hand, when the vinyl aromatic compound content exceeds 97% by weight, the content of the unsaturated dicarboxylic acid group or group derived therefrom inevitably becomes less than 0.05 part by weight per 100 parts by weight of the base block copolymer. In this case as well, the modified block copolymer does not exhibit any significant dispersion morphology-promoting effect.

As mentioned above, when the content of the unsaturated dicarboxylic acid group or group derived therefrom in the modified block copolymer (D) is less than 0.05 part by weight per 100 parts by weight of the base block copolymer, the modified block copolymer does not exhibit any significant dispersion morphology-promoting effect. On the other hand, when the content exceeds 5 parts by weight, the action and effect of the modified block copolymer is not further improved, and there is an economic disadvantage.

The number average molecular weight of the modified block copolymer is generally in the range of from 50,000 to 200,000, preferably from 100,000 to 150,000.

The number average molecular weight ($\overline{Mn}$), as used herein, of each of the block copolymer components ($\alpha$), ($\beta$) and (D) defines a value obtained from the measurements by means of gel permeation chromatography (GPC) through the calculation according to a customary method [e.g., method described in "Gel Chromatography (Fundamentals)" published by Kodansha Publishing Co., Ltd., Japan]. The calibration curve for the GPC is one prepared using standard polystyrene.

Now, a preferred mode of the method for manufacturing the composition of the present invention will be described.

The composition of the present invention may be manufactured by melt kneading the polyamide (B), the polyphenylene ether (A) and the block copolymer (C), optionally together with the modified block copolymer (D). All of the components may be simultaneously charged and kneaded in a kneader. Alternatively, some of the components may first be kneaded to prepare a premix and the premix may be blended with another premix which has been separately prepared, thereby obtaining the present composition. Moreover, in a further method, some of the components may first be kneaded to prepare a premix and the premix may be blended with the other components, thereby obtaining the present composition.

In addition, from the viewpoint of attaining process simplification, it is preferred that in preparing the modified block copolymer (D) by kneading and reacting the base block copolymer and the unsaturated dicarboxylic acid or compound derived therefrom in an extruder, the polyphenylene ether (A), the polyamide (B) and the block copolymer (C) are simultaneously fed into the extruder, thereby obtaining the composition of the present invention at once.

Further, in performing the melt kneading, there may be used a particle diameter modifier of the dispersed polyphenylene ether (A), such as a maleic acid compound, a copolymer of a styrene compound and an $\alpha,\beta$-unsaturated dicarboxylic acid derivative and a silane compound. Examples of maleic acid compounds include maleic acid, maleic anhydride, a semi-alkyl ester of maleic acid, maleinamide and maleimide. Of these, maleic acid and maleic anhydride are preferred. Examples of copolymers of a styrene compound and an $\alpha,\beta$-unsaturated dicarboxylic derivative include a copolymer of styrene and maleic anhydride, a copolymer of styrene and a semi-alkyl ester of maleic acid and a copolymer of styrene and maleimide. Of these, a copolymer of styrene and maleic anhydride is preferred. Silane compounds are compounds simultaneously containing (a) a carbon-silicon bond, (b) halogen or an alkoxy group, and (c) an alkyl group, vinyl group, amino group, epoxy group or mercapto group. Examples of preferred silane compounds include vinylmethoxysilane and $\gamma$-aminopropylmethoxysilane.

The content of the particle diameter modifier is desirably in the range of from 0.05 to 10 parts by weight, preferably in the range of from 0.1 to 5 parts by weight, per 100 parts by weight of the total of the above-mentioned three components (A), (B) and (C). If the content is less than 0.05 part by weight, it becomes rather difficult to cause the polyphenylene ether to have an average dispersed particle diameter of not greater than 10 $\mu$m, while if it exceeds 10 parts by weight, no further effect is obtained, leading to an economical disadvantage.

The temperature and time for melt kneading vary depending on the proportions of the polyamide and the polyphenylene ether. In general, the temperature is selected in the range of from 240 to 350 ° C., preferably in the range of from 260 to 320 ° C., and the kneading time is selected in the range of from 0.2 to 10 min, preferably in the range of from 0.5 to 5 min. With respect to the apparatus for melt kneading, there can be employed an extruder, a kneader, a roll or the like. An extruder is particularly suitable.

In the production of the composition of the present invention, the kneading conditions are of crucial importance, and if the components are simply melt-kneaded, a composition having the desired dispersion morphology is not necessarily obtained. That is, in the present composition, only when the PPE(A) is dispersed in the polyamide (B) while the hydrogenated block copolymer ($\alpha$) is micro-dispersed in the dispersed PPE(A), is an excellent balance of properties exerted. It is particularly important that the hydrogenated block copolymer ($\alpha$) be micro-dispersed in the dispersed PPE(A). When the kneading force is insufficient, even though the PPE(A) is dispersed in the polyamide (B), the hydrogenated block copolymer ($\alpha$) is not micro-dispersed in the dispersed PPE(A) but forms aggregates around the interface between the PPE(A) and the polyamide (B), leading to a lowering in stiffness, impact resistance and heat resistance of the composition.

As described above, it is important to micro-disperse the hydrogenated block copolymer ($\alpha$) in the dispersed PPE(A). For this purpose, it is necessary to use an extruder which is capable of exerting a sufficiently strong kneading power. Since a large capacity extruder is generally capable of exerting high kneading power, it is preferred to use a large capacity extruder. Particularly, it is recommended to use an extruder having a screw diameter of at least 30 mm, preferably 45 mm or more. When an extruder having a screw diameter of less than 30 mm is used, it is almost impossible to micro-disperse the hydrogenated block copolymer ($\alpha$) in the dispersed PPE(A) even if any other kneading conditions are chosen. In addition, it is noted that even if a large capacity extruder is used, the characteristic morphology of the present invention cannot be obtained unless a rotation speed over a certain level is employed for kneading.

There can be added to the composition of the present invention, if desired, another polymer, another elastomer, a plasticizer, a fire retarder, a filler such as a glass fiber, a carbon fiber, carbon black, silica and clay, and the like as long as the desired properties of the present invention are not impaired. As the above-mentioned other polymer, a polymer which is substantially compatible with the polyphenylene ether phase is preferred. For example, a polystyrene and a rubber-modified polystyrene may be mentioned. As the above-mentioned other elastomer, an elastomer capable of modifying the polyamide employed is preferred. For example, a maleic anhydride-modified ethylene-propylene-diene copolymer may be mentioned.

The dispersion morphology of the composition of the present invention ca be confirmed by observation using an electron photomicrograph. The particle size of the dispersed phase can be calculated as follows.

An electron photomicrograph (×4,000) of an ultrathin section cut from a molded article is taken by means of a transmission type electron microscope. The diameters "di" of the dispersed particles are measured and the number "ni" of particles having diameters of "di" is counted. Then, the average diameter of the dispersed phase is calculated in accordance with the following formula.

$$\text{Average diameter} = \frac{\Sigma d_i^4 n_i}{\Sigma d_i^3 n_i}$$

When the particles do not have spherical shapes, the major diameter and minor diameter are measured. A half of the sum of the major diameter and the minor diameter is determined as a particle diameter. At least 2,000 particles are measured for obtaining the average particle diameter.

The thermoplastic resin composition of the present invention comprises a polyamide (B), a polyphenylene ether (A) and a block copolymer (C) as main components, and these three components form a specific dispersed morphology. Thus, the composition of the present invention has an excellent balance of properties such as heat distortion resistance, impact resistance, oil resistance, stiffness and melt flow properties as compared to the conventional compositions. Further, the present composition has excellent thermal stability and, therefore, almost no decrease in impact resistance is caused under severe molding conditions, i.e. during residence of the composition in a molding machine.

It is believed that the morphology wherein the block copolymer (C) having excellent thermal stability is micro-dispersed in the polyphenylene ether phase gives excellent heat resistance, stiffness and oil resistance, and that the morphology wherein the polyphenylene ether phase in which the block copolymer (C) is micro-dispersed is dispersed in the polyamide phase gives improved impact resistance without impairing the above-mentioned properties.

Further, the resin composition of the present invention in which the modified block copolymer (D) is incorporated is remarkably excellent in practical mechanical strengths, such as impact resistance at low temperatures and weld-line strength.

BEST MODE OF CARRYING OUT THE INVENTION

The present invention will be described in more detail with reference to Examples and Comparative Examples, which should not be construed as limiting the scope of the present invention.

EXAMPLES AND COMPARATIVE EXAMPLES

When a hydrogenated block copolymer and a block copolymer are commercially available, such copolymers were purchased and used, and the trade name and the name of the manufacturer of each copolymer employed are described below each Table. The copolymers which are not commercially available were polymerized in substantially the same manner as that described below.

METHOD FOR POLYMERIZING A BLOCK COPOLYMER

With respect to the production of, for example, a styrene-butadiene-styrene block copolymer having a styrene content of 25% by weight, an explanation will be given. 12.5 Parts by weight of styrene are polymerized in cyclohexane using butyl lithium as a catalyst. 75 Parts by weight of butadiene are added to the polymerized styrene, and then further polymerized. 12.5 Parts by weight of styrene is added to the polymerized product, and then further polymerized. Thus, there is obtained a solution containing 20% by weight of a block copolymer having a styrene content of 25% by weight. By changing the amounts of styrene and butadiene used, there can be obtained block copolymers having desired styrene contents. The block copolymer is hereinafter referred to as "block TR".

The thus obtained block copolymers are hydrogenated according to the method described in Japanese Patent Application Laid-open Specification No. 59-133203, to thereby obtain hydrogenated block copolymers having desired hydrogenation degrees. The hydrogenated block copolymer is hereinafter referred to as "block HTR".

Preparation of Specimen and Measurement of Physical Properties

Specimens were prepared using an injection molding machine (Model IS80AM manufactured by Toshiba Machine Co., Ltd., Japan; cylinder temperature: 270° C., molding cycle: 1 min), and the properties of the specimens were determined according to the following test methods.

| | |
|---|---|
| Izod impact strength: | ASTM-D256, notched, ⅛ inch in thickness |
| Modulus in flexure: | ASTM-D790 |
| Heat distortion temperature: | ASTM-D648 load: 18.6 kg/cm² |
| Thermal stability: | A specimen is prepared using an injection molding machine Model IS80AM manufactured by Toshiba Machine Co., Ltd., Japan at a cylinder temperature of 300° C. at a molding cycle of 10 min so that the composition resides in the molding machine. Then, the Izod impact strength of the resultant specimen was measured. The ratio of the Izod impact strength of the specimen obtained above to that of the specimen obtained at a cylinder temperature of 270° C. at a molding cycle of 1 min was calculated. |
| Weld-line strength: | A square tube, the cross-section of which has an outer side of 125 mm and an inner side of 100 mm was obtained by molding. The weld-line strength of the article was measured by Du Pont's drop weight test (measured at −40° C. using a drop weight having a diameter of ⅛ inch). |
| Oil resistance: | The appearance of an article was examined after exposing an article to a vapor of 1,1,1-trichloroethane for 5 min. |

EXAMPLES 1 AND 2, COMPARATIVE EXAMPLES 1 AND 2

45 parts by weight of poly(2,6-dimethylphenylene-1,4-ether) having an intrinsic viscosity of 0.62 (30° C., in chloroform), 45 parts by weight of 6,6-nylon (Leona 1300S, manufactured by Asahi Kasei Kogyo Kabushiki Kaisha, Japan), 10 parts by weight of a hydrogenated block copolymer (the copolymers having the structures and the styrene contents as shown in Table 1 were used), and 0.5 part by weight of maleic anhydride were charged in a twin-screw extruder (Model ZSK53, manufactured by Werner & Pfleiderer, West Germany) which has screws each having a diameter of 53 mm. The extrusion-kneading was performed at 290° C. at 200 rpm, to thereby obtain pellets. Then, a specimen was prepared from the pellets according to the method as described before, and the properties of the specimen were determined. The results are shown in Table 1.

As apparent from Table 1, the compositions obtained in Examples 1 and 2 were excellent in heat distortion resistance, impact resistance, stiffness, oil resistance and thermal stability.

By contrast, with respect to the composition of Comparative Example 1 obtained using an HTR having no polystyrene block, most of the HTR was not dispersed in the polyphenylene ether but was dispersed in the polyamide phase, so that the composition was poor in heat distortion resistance and stiffness.

Further, with respect to the composition of Comparative Example 2 obtained using an unsaturated block copolymer, after the residence of the specimen in a molding machine, the impact strength was markedly lowered, and the thermal stability was poor.

EXAMPLES 3 TO 7, COMPARATIVE EXAMPLES 3 TO 7

Substantially the same procedures as in Example 1 were repeated except that block HTR's having the compositions shown in Table 2 were used, to thereby prepare pellets and determine their properties. The results are shown in Table 2.

TABLE 1

|  |  | Ex. 1 | Ex. 2 | Comp. Ex. 1 | Comp. Ex. 2 |
|---|---|---|---|---|---|
| (a) hydrogenated block copolymer *3) | structure | block HTR | block HTR | random HTR *1) | block TR *2) |
|  | molecular weight ($\times 10^3$) | 80 | 170 |  |  |
|  | bound styrene content (wt. %) | 30 | 30 | 25 | 30 |
| dispersion morphology | continuous phase | polyamide | polyamide | polyamide | polyamide |
|  | dispersed phase | PPE + HTR | PPE + HTR | PPE + HTR | PPE + TR |
|  | dispersion morphology of component (a) | dispersed in PPE phase | dispersed in PPE phase | almost not present in PPE | TR is dispersed in PPE |
| particle size of PPE (μm) |  | 5.0 | 4.0 | — | 3.5 |
| properties | Izod impact strength 23° C. (kg · cm/cm) | 28 | 30 | 10 | 30 |
|  | flexural modulus of elasticity (kg/cm²) | 23,000 | 23,000 | 16,000 | 21,000 |
|  | heat distort. temp. (°C.) | 140 | 135 | 115 | 135 |
|  | thermal stability (%) | 80 | 85 | 60 | 30 |
|  | oil resistance | good | good | slightly poor | good |

*1) A block TR obtained by the hydrogenation of Solprene 1204 (manufactured by Japan Elastomer Co., Ltd.)
*2) Tufprene 200 (manufactured by Asahi Kasei Kogyo K.K.)
*3) The component (C) of the present invention consists of the component (a).

TABLE 2

|  |  | Ex. 3 | Ex. 4 | Ex. 5 | Ex. 6 | Ex. 7 | Comp. Ex. 3 |
|---|---|---|---|---|---|---|---|
| (a) hydrogenated block copolymer *1) | structure | block HTR | block HTR | block HTR | block HTR | block HTR | block HTR |
|  | molecular weight ($\times 10^3$) | 70 | 170 | 70 | 70 | 70 | 63 |
|  | bound styrene content (wt. %) | 40 | 35 | 35 | 50 | 70 | 10 |
| dispersion morphology | continuous phase | polyamide | polyamide | polyamide | polyamide | polyamide | polyamide |
|  | dispersed phase | PPE + HTR | PPE + HTR | PPE + HTR | PPE + HTR | PPE + HTR | PPE + HTR |
|  | dispersion morphology of component (a) | dispersed in PPE phase | dispersed in PPE phase | dispersed in PPE phase | dispersed in PPE phase | dispersed in PPE phase | almost not present in PPE |
| particle size of PPE (μm) |  | 3.0 | 2.5 | 4.5 | 3.5 | 2.0 | — |
| properties | Izod impact strength 23° C. (kg · cm/cm) | 35 | 37 | 30 | 30 | 20 | 10 |
|  | −30° C. (kg · cm/cm) | 13 | 14 | 12 | 12 | 8 | — |
|  | flexural modulus of elasticity (kg/cm²) | 22,500 | 22,500 | 22,500 | 23,000 | 25,000 | 16,000 |
|  | heat distortion temperature (°C.) | 140 | 140 | 140 | 140 | 135 | 115 |
|  | thermal stability (%) | 80 | 85 | 85 | 85 | 85 | — |

|  |  | Comp. Ex. 4 | Comp. Ex. 5 | Comp. Ex. 6 | Comp. Ex. 7 |
|---|---|---|---|---|---|
| (a) hydrogenated block copolymer | structure | block HTR | block HTR | block HTR | block HTR |
|  | molecular weight ($\times 10^3$) | 65 | 45 | 100 | 70 |
|  | bound styrene content (wt. %) | 20 | 20 | 18 | 90 |
| dispersion morphology | continuous phase | polyamide | polyamide | polyamide | polyamide |
|  | dispersed phase | PPE + HTR | PPE + HTR | PPE + HTR | PPE + HTR |

TABLE 2-continued

|  |  |  | | | | |
|---|---|---|---|---|---|---|
|  | dispersion morphology of component (a) |  | almost not present in PPE | almost not present in PPE | almost not present in PPE | dispersed in PPE phase |
| particle size of PPE (μm) | | | — | — | — | 2.0 |
| properties | Izod impact strength | 23° C. (kg · cm/cm) | 11 | 9 | 8 | 10 |
|  |  | −30° C. (kg · cm/cm) | — | — | — | — |
|  | flexural modulus of elasticity (kg/cm$^2$) | | 17,500 | 18,000 | 17,000 | 25,500 |
|  | heat distortion temperature (°C.) | | 115 | 120 | 125 | 135 |
|  | thermal stability (%) | | — | — | — | 85 |

*1) The component (C) of the present invention consists of the component (a).

From Table 2, it is apparent that the compositions of Examples 3 to 7 have an excellent balance in heat distortion resistance, impact resistance and stiffness.

In particular, it is apparent that the compositions of Examples 3 to 6 obtained by the use of a block copolymer having a bound styrene content of from 35 to 50% by weight have markedly improved impact resistance. Also, it is apparent that in Example 7, a composition having high stiffness was obtained.

It is also apparent that the compositions of Comparative Examples 3 to 6 in which block copolymers other than those employed in the present invention were used are inferior to the present compositions in impact resistance, heat distortion resistance and stiffness since the block copolymers are not dispersed in the polyphenylene ether phase. Also, it is apparent that the composition of Comparative Example 7 produced using a block copolymer having polystyrene blocks, the bound styrene content of which is, however, as high as 90% by weight, exhibits poor impact resistance.

EXAMPLES 8 AND 9 AND COMPARATIVE EXAMPLE 8

Substantially the same procedure as described in Example 4 was repeated in Examples 8 and 9 and Comparative Example 8, except that in performing the extrusion, the revolution speeds were changed to 150, 100 and 50 rpm, respectively. The results are shown in Table 3. From Table 3, it is apparent that the composition of Comparative Example 8 in which the average particle diameter of the PPE exceeded 10 μm exhibits disadvantageously lowered impact resistance.

EXAMPLE 10

Substantially the same procedure as described in Example 1 was repeated, except that an oil-extended hydrogenated block copolymer was used in place of the hydrogenated block copolymer. The oil-extended HTR was obtained as follows. First, 70 parts by weight of a hydrogenated block copolymer (having a molecular weight and a bound styrene content as indicated in Table 3) was blended with 30 parts by weight of a paraffinic process oil (Diana process oil PW380 manufactured by Idemitsu Kosan Co., Ltd., Japan) by means of a Henscel mixer. Then, the blend was melt kneaded at 240° C. in a 30 mm-diameter twin-screw extruder, and extruded, thereby obtaining the desired oil-extended HTR in a pellet form.

The results are shown in Table 3. From Table 3, it is apparent that the use of the oil-extended HTR enables the diameter of dispersed particles to be small, thereby further improving the impact resistance and thermal stability of the composition.

TABLE 3

|  |  | Ex. 8 | Ex. 9 | Comp. Ex. 8 | Comp. Ex. 9 |
|---|---|---|---|---|---|
| (a) hydrogenated block copolymer*1) | structure | block HTR | block HTR | block HTR | oil-extended block HTR |
|  | molecular weight (×10$^3$) | 170 | 170 | 170 | 170 |
|  | bound styrene content (wt. %) | 35 | 35 | 35 | 35 |
| dispersion morphology | continuous phase | polyamide | polyamide | polyamide | polyamide |
|  | dispersed phase | PPE + HTR | PPE + HTR | PPE + HTR | PPE + HTR |
|  | dispersion morphology of component (a) | dispersed in PPE phase | dispersed in PPE phase | aggregated around the interface of PPE and Polyamide | dispersed in PPE phase |
| particle size of PPE (μm) | | 5.0 | 7.5 | 15 | 1.5 |
| properties | Izod impact strength 23° C. (kg · cm/cm) | 30 | 25 | 7 | 45 |
|  | −30° C. (kg · cm/cm) | — | — | — | 15 |
|  | flexural modulus of elasticity (kg/cm$^2$) | 22,000 | 21,000 | 19,500 | 22,500 |
|  | heat distort. temp. (°C.) | 140 | 138 | 125 | 140 |
|  | thermal stability (%) | 80 | 70 | 60 | 90 |

*1) The component (C) of the present invention consists of the component (a).

EXAMPLES 11 TO 13

Substantially the same procedures as described in Examples 3, 4 and 10 were repeated in Examples 11, 12 and 13, respectively, except that nylon-6 (Bright manufactured by Asahi Kasei Kogyo Kabushiki Kaisha, Japan) was used in place of the nylon-66. Thus, pellets were obtained, and the properties thereof were measured. The results are shown in Table 4.

TABLE 4

|  |  | Ex. 11 | Ex. 12 | Ex. 13 |
|---|---|---|---|---|
| (a) hydrogenated block copolymer*1) | structure | block HTR | block HTR | oil-extended block HTR |
|  | molecular weight (×10³) | 70 | 170 | 170 |
|  | bound styrene content (wt. %) | 40 | 35 | 35 |
| dispersion morphology | continuous phase | polyamide | polyamide | polyamide |
|  | dispersed phase | PPE + HTR | PPE + HTR | PPE + HTR |
|  | dispersion morphology of component (a) | dispersed in PPE phase | dispersed in PPE phase | dispersed in PPE phase |
| particle size of PPE (μm) |  | 3.0 | 2.3 | 1.5 |
| properties | Izod impact strength 23° C. (kg·cm/cm) | 40 | 45 | 60 |
|  | −30° C. (kg·cm/cm) | 14 | 16 | 20 |
|  | flexural modulus of elasticity (kg/cm²) | 21,000 | 21,000 | 21,500 |
|  | heat distort. temp. (°C.) | 125 | 125 | 123 |
|  | thermal stability (%) | 80 | 85 | 90 |

*1) The component (C) of the present invention consists of the component (a).

EXAMPLES 14 TO 18 AND COMPARATIVE EXAMPLES 9 to 10

Substantially the same procedure as described in Example 4 was repeated, except that the polyphenylene ether, polyamide and block copolymer as indicated in Table 5 were used in the amounts indicated in Table 5. Thus, pellets were obtained, and the properties thereof were measured. The results are shown in Table 5.

EXAMPLES 19 AND 20 AND COMPARATIVE EXAMPLES 11 AND 12

Using 45 parts by weight of poly(2,6-dimethylphenylene-1,4-ether) having an intrinsic viscosity (measured at 30° C. in chloroform) of 0.62, 45 parts by weight of 6,6-nylon (Leona 1300S manufactured by Asahi Kasei Kogyo Kabushiki Kaisha, Japan), 10 parts by weight of a block copolymer (having the structure, bound styrene

TABLE 5

|  |  | Comp. Ex. 9 | Ex. 14 | Ex. 15 | Ex. 16 | Comp. Ex. 10 | Ex. 17 | Ex. 18 |
|---|---|---|---|---|---|---|---|---|
| formulation | (A) PPE (pbw) | 75 | 65 | 40 | 30 | 15 | 50 | 40 |
|  | (B) polyamide (pbw) | 15 | 25 | 50 | 60 | 75 | 45 | 40 |
|  | (a) hydrogenated block copolymer (pbw)*1) | 10 | 10 | 10 | 10 | 10 | 5 | 20 |
| dispersion morphology | continuous phase | PPE | polyamide | polyamide | polyamide | polyamide | polyamide | polyamide |
|  | dispersed phase | polyamide + HTR | PPE + HTR | PPE + HTR | PPE + HTR | PPE + HTR | PPE + HTR | PPE + HTR |
|  | dispersion morphology of component (a) | — | dispersed in PPE phase | dispersed in PPE phase | dispersed in PPE phase | dispersed in PPE phase | dispersed in PPE phase | dispersed in PPE phase |
| particle size of PPE (μm) |  | — | 5.0 | 2.3 | 2.0 | 1.8 | 3.0 | 3.5 |
| properties | Izod impact strength 23° C. (kg·cm/cm) | 15 | 25 | 35 | 35 | 25 | 30 | 40 |
|  | −30° C. (kg·cm/cm) | — | 9 | 12 | 12 | — | 11 | 15 |
|  | flexural modulus of elasticity (kg/cm²) | 20,000 | 22,500 | 22,500 | 23,500 | 20,000 | 22,500 | 20,500 |
|  | heat distortion temperature (°C.) | 115 | 145 | 135 | 120 | 80 | 145 | 130 |
|  | thermal stability (%) | — | 75 | 85 | 85 | 85 | 80 | 85 |
|  | oil resistance (kg/cm²) | poor | good | good | good | good | good | good |

*1) The component (C) of the present invention consists of the component (a).

From Table 5, it is apparent that all of the compositions of Examples 14 to 18 according to the present invention have excellent thermal stability and exhibit an excellent balance in heat distortion resistance, impact resistance and stiffness.

By contrast, in the composition of Comparative Example 9, the polyphenylene ether also forms a continuous phase, thereby causing the composition to have extremely poor oil resistance, heat resistance and impact resistance. Moreover, it is apparent that since the composition of Comparative Example 10 has a low polyphenylene ether content, it exhibits poor heat distortion resistance.

content and molecular weight each indicated in Table 6) and 2.5 parts by weight of a modified block copolymer obtained by modifying with maleic anhydride a styrene-butadiene block copolymer having the bound styrene content indicated in Table 6, pellets were obtained in substantially the same manner as described in Example 1.

Except Comparative Example 11, there was employed a modified block copolymer produced by adding 2 parts by weight of maleic anhydride and 0.5 part by weight of phenothiazine as a stabilizer to 100 parts by weight of a styrene-butadiene block copolymer (Asaflex 810 manufactured by Asahi Kasei Kogyo Kabushiki Kaisha, Japan) in a twin-screw extruder, and then performing melt extrusion at 90° C. The maleic acid content of the modified block copolymer was determined by dissolving the copolymer in toluene and subjecting the resultant solution to acid-base titration, and found to be about 0.5% by the weight.

In Comparative Example 11, there was employed the Asaflex 880 styrene-butadiene block copolymer, manufactured by Asahi Kasei Kogyo Kabushiki Kaisha, Japan, as it is without effecting any modification.

Subsequently, specimens were prepared and the properties thereof were measured in substantially the same manner as described in Example 1. The results are shown in Table 6.

As apparent from Table 6, the compositions of Examples 19 and 20 exhibit markedly improved impact resistance. In particular, these exhibit markedly improved impact resistance at low temperatures.

In the composition of Comparative Example 11, the particle diameter is large and its impact resistance is extremely low.

Further, with respect to the composition of Comparative Example 12 in which an unsaturated block copolymer was used as the component (α), the residence of the composition in a molding machine causes the composition to exhibit disadvantageously lowered impact resistance and thermal stability.

EXAMPLES 21 TO 23 AND COMPARATIVE EXAMPLE 13

Substantially the same procedure as described in Example 19 was repeated, except that the molecular weight of the bound styrene of the block HTR was varied. Thus, pellets were produced, and the properties thereof were determined. The results are shown in Table 6.

From Table 6, it is apparent that the compositions of Examples 21 to 23 have an excellent balance in heat distortion resistance, impact resistance, stiffness and thermal stability.

By contrast, in the composition of Comparative Example 13 in which use was made of a block copolymer having a bound styrene content of 10% by weight that was outside the scope of the present invention, and having a molecular weight of 63,000, the block copolymer was not dispersed in the polyphenylene ether phase, thereby causing the composition to exhibit poor impact resistance, heat distortion resistance and stiffness.

EXAMPLE 24

Substantially the same procedure as described in Example 19 was repeated, except that an oil-extended HTR was used in place of the hydrogenated block copolymer. The results are shown in Table 6. From Table 6, it is apparent that the composition exhibits remarkably improved impact resistance.

TABLE 6

| | | Ex. 19 | Ex. 20 | Comp. Ex. 11 | Comp. Ex. 12 | Ex. 21 |
|---|---|---|---|---|---|---|
| (α) hydrogenated block copolymer*2) | structure | block HTR | block HTR | block HTR | block HTR*1) | block HTR |
| | molecular weight ($\times 10^3$) | 80 | 170 | 80 | — | 45 |
| | bound styrene content (wt. %) | 30 | 30 | 30 | 30 | 40 |
| component (D) | bound styrene content (wt. %) | 80 | 80 | 93 | 80 | 80 |
| | grafted maleic acid content (wt. %) | 0.5 | 0.5 | 0 | 0.5 | 0.5 |
| dispersion morphology | continuous phase | polyamide | polyamide | polyamide | polyamide | polyamide |
| | dispersed phase | PPE + HTR | PPE + HTR | PPE + HTR | PPE + HTR | PPE + HTR |
| | dispersion morphology of component (α) | dispersed in PPE phase | dispersed in PPE phase | dispersed in PPE phase | dispersed in PPE phase | dispersed in PPE phase |
| particle size of PPE (μm) | | 2.0 | 1.5 | 6.5 | 1.0 | 3.5 |
| properties | Izod impact 23° C. (kg · cm/cm) | 45 | 50 | 15 | 40 | 25 |
| | strength −30° C. (kg · cm/cm) | 23 | 23 | — | 18 | 12 |
| | flexural modulus of elasticity (kg/cm$^2$) | 22,500 | 22,500 | 22,000 | 22,500 | 22,500 |
| | heat distortion temperature (°C.) | 138 | 138 | 138 | 138 | 138 |
| | thermal stability (%) | 85 | 90 | 50 | 30 | 75 |

| | | Ex. 22 | Ex. 23 | Comp. Ex. 13 | Ex. 24 |
|---|---|---|---|---|---|
| (α) hydrogenated block copolymer | structure | block HTR | block HTR | block HTR | oil-extended block HTR |
| | molecular weight ($\times 10^3$) | 70 | 170 | 63 | 170 |
| | bound styrene content (wt. %) | 40 | 35 | 10 | 35 |
| component (D) | bound styrene content (wt. %) | 80 | 80 | 80 | 80 |
| | grafted maleic acid content (wt. %) | 0.5 | 0.5 | 0.5 | 0.5 |
| dispersion morphology | continuous phase | polyamide | polyamide | polyamide | polyamide |
| | dispersed phase | PPE + HTR | PPE + HTR | PPE + HTR | PPE + HTR |
| | dispersion morphology of component (α) | dispersed in PPE phase | dispersed in PPE phase | almost not present in PPE | dispersed in PPE phase |
| particle size of PPE (μm) | | 1.3 | 1.5 | — | 0.8 |
| properties | Izod impact 23° C. (kg · cm/cm) | 50 | 45 | 12 | 60 |
| | strength −30° C. | 24 | 21 | — | 28 |

TABLE 6-continued

|  |  |  |  |  |
|---|---|---|---|---|
| (kg · cm/cm) flexural modulus of elasticity (kg/cm$^2$) | 22,500 | 22,500 | 15,500 | 22,500 |
| heat distortion temperature (°C.) | 138 | 138 | 110 | 133 |
| thermal stability (%) | 90 | 90 | — | 90 |

*1) Tufprene 200 (manufactured by Asahi Kasei Kogyo K.K.)
*2) The component (C) of the present invention consists of the component (a).

EXAMPLES 25 TO 27

Using substantially the same compositions as in Examples 22 to 24 except that 6-nylon was employed in place of 6,6-nylon, pellets were produced in substantially the same manner as in Example 19. The dispersion morphology and properties of the pellets were evaluated. The results are shown in Table 7.

those of Examples 3, 4 and 10 in which the modified block copolymer was not incorporated.

EXAMPLES 28 TO 32 AND COMPARATIVE EXAMPLES 14 AND 15

Pellets were obtained in substantially the same manner as in Example 19 except that the proportions of the polyphenylene ether, the polyamide, the hydrogenated

TABLE 7

|  |  | EX. 25 | Ex. 26 | Ex. 27 |
|---|---|---|---|---|
| (a) hydrogenated block copolymer*1) | structure | block HTR | block HTR | oil-extended block HTR |
|  | molecular weight (× 10$^3$) | 70 | 170 | 170 |
|  | bound styrene content (wt. %) | 40 | 35 | 35 |
| (D) component | bound styrene content (wt. %) | 80 | 80 | 80 |
|  | grafted maleic acid content (wt. %) | 0.5 | 0.5 | 0.5 |
| dispersion morphology | continuous phase | polyamide | polyamide | polyamide |
|  | dispersed phase | PPE + HTR | PPE + HTR | PPE + HTR |
|  | dispersion morphology of component (a) | dispersed in PPE phase | dispersed in PPE phase | dispersed in PPE phase |
| particle size of PPE (μm) |  | 1.3 | 1.0 | 0.8 |
| properties | Izod 23° C. impact (kg · cm/cm) | 65 | 70 | 80 |
|  | strength −30° C. (kg · cm/cm) | 33 | 36 | 40 |
|  | flexural modulus of elasticity (kg/cm$^2$) | 21,000 | 21,000 | 21,000 |
|  | heat distort. temp. (°C.) | 120 | 120 | 120 |
|  | thermal stability (%) | 90 | 90 | 90 |

*1) The component (C) of the present invention consists of the components (a) and (β).

It is apparent from Table 7 that resistance at low temperature (−30° C.) is markedly improved while that at room temperature is also improved, as compared to block copolymer and the modified block copolymer were changed to those indicated in Table 8. The characteristics and properties of the pellets were evaluated and the results are shown in Table 8.

TABLE 8

|  |  | Comp. Ex. 14 | Ex. 28 | Ex. 29 | Ex. 30 | Comp. Ex. 15 | Ex. 31 | Ex. 32 |
|---|---|---|---|---|---|---|---|---|
| formulation | (A) PPE (pbw) | 75 | 65 | 40 | 30 | 15 | 45 | 40 |
|  | (B) polyamide (pbw) | 15 | 25 | 50 | 60 | 75 | 45 | 40 |
|  | (a) hydrogenated block copolymer (pbw)*1) | 10 | 10 | 10 | 10 | 10 | 10 | 20 |
|  | (D) modified block copolymer (pbw) | 2.5 | 2.5 | 2.5 | 2.5 | 2.5 | 5 | 2.5 |
| dispersion morphology | continuous phase | PPE | polyamide | polyamide | polyamide | polyamide | polyamide | polyamide |
|  | dispersed phase | polyamide + HTR | PPE + HTR | PPE + HTR | PPE + HTR | PPE + HTR | PPE + HTR | PPE + HTR |
|  | dispersion morphology of component (a) | dispersed in PPE | dispersed in PPE | dispersed in PPE | dispersed in PPE | dispersed in PPE | dispersed in PPE | dispersed in PPE |
| particle size of PPE (μm) |  | — | 3.0 | 1.5 | 1.0 | 0.9 | 0.8 | 1.2 |
| properties | Izod 23° C. impact (kg · cm/cm) | 6 | 40 | 70 | 75 | 60 | 75 | 85 |
|  | strength −30° C. (kg · cm/cm) | — | 18 | 30 | 35 | 25 | 38 | 35 |
|  | flexural modulus of elasticity (kg/cm$^2$) | 20,000 | 22,500 | 22,500 | 23,000 | 20,000 | 23,000 | 20,500 |
|  | heat distort. temp. (°C.) | 138 | 145 | 135 | 120 | 80 | 130 | 120 |
|  | thermal stability (%) | — | 75 | 90 | 90 | 85 | 90 | 85 |
|  | oil resistance (kg/cm$^2$) | poor | good | good | good | good | good | good |

*1) The component (C) of the present invention consists of the component (a).

From Table 8 it is apparent that the compositions of Examples 28 to 32, which are within the scope of the present invention, are not only excellent in thermal stability but also extremely excellent in the balance of heat distortion temperature, impact resistance and stiffness.

It is also apparent from Table 8 that in the composition of Comparative Example 14, the polyphenylene ether forms a continuous phase and the oil resistance, heat resistance and impact resistance are extremely poor and that the composition of Comparative Example 15, which is small in the polyphenylene ether content, is low in heat distortion resistance.

EXAMPLES 33 TO 36 AND COMPARATIVE EXAMPLE 16

In Examples 33 to 35, pellets were obtained in substantially the same manner as in Example 4 except that a hydrogenated block copolymer was employed in combination with a block copolymer (Tufprene 200 manufactured by Asahi Kasei Kogyo K.K., Japan) in place of the single use of a hydrogenated block copolymer. The characteristics and properties of the pellets were evaluated and the results are shown in Table 9. From Table 9, it is apparent that the compositions of Examples 33 to 35 which are within the scope of the present invention, have an extremely excellent balance of weld-line strength and thermal stability, that the composition of Example 36, in which the hydrogenated block copolymer alone was used as the component (C), is weak in weld-line strength but excellent in thermal stability, and that the composition of Comparative Example 16, in which the unsaturated block copolymer alone was used as the component (C), is poor in thermal stability.

EXAMPLES 37 TO 40 AND COMPARATIVE EXAMPLE 17

In Examples 37 to 39, pellets were obtained in substantially the same manner as in Example 23 except that a hydrogenated block copolymer was used in combination with a block copolymer in place of the single use of a hydrogenated block copolymer. The characteristics and properties of the pellets were evaluated, and the results are shown in Table 9. From Table 9, it is apparent that each of the compositions of Examples 37 to 39, which are within the scope of the present invention, has an extremely excellent balance of weld-line strength and thermal stability, that the composition of Example 40, in which the hydrogenated block copolymer alone was used as component (C), is weak in weld-line strength but excellent in thermal stability, and that the composition of Comparative Example 17, in which the unsaturated block copolymer alone was used as component (C), is poor in thermal stability.

TABLE 9

| | | Ex. 33 | Ex. 34 | Ex. 35 | Ex. 36 | Comp. Ex. 16 |
|---|---|---|---|---|---|---|
| formulation | (A) PPE (pbw) | 45 | 45 | 45 | 45 | 45 |
| | (B) polyamide (pbw) | 45 | 45 | 45 | 45 | 45 |
| | (a) hydrogenated block copolymer (pbw) | 5 | 7 | 3 | 10 | 0 |
| | (D) modified block copolymer (pbw) | 0 | 0 | 0 | 0 | 0 |
| | (β) diene block copolymer (pbw) | 5 | 3 | 7 | 0 | 10 |
| dispersion morphology | continuous phase | polyamide | polyamide | polyamide | polyamide | polyamide |
| | dispersed phase | PPE + HTR | PPE + HTR | PPE + HTR | PPE + HTR | PPE + HTR |
| | dispersion morphology of components (a) and (β) *1) | dispersed in PPE phase | dispersed in PPE phase | dispersed in PPE phase | dispersed in PPE phase | dispersed in PPE phase |
| particle size of PPE (μm) | | 3.0 | 2.5 | 3.0 | 2.5 | 2.0 |
| properties | Izod 23° C. impact (kg · cm/cm) strength | 35 | 35 | 37 | 37 | 35 |
| | flexural modulus of elasticity (kg/cm²) | 22,000 | 22,500 | 22,000 | 22,500 | 21,500 |
| | heat distortion temperature (°C.) | 138 | 138 | 138 | 138 | 138 |
| | thermal stability (%) | 80 | 85 | 70 | 85 | 30 |
| | weld-line strength (kg/cm²) | 42 | 45 | 30 | 3 | 60 |
| | | Ex. 37 | Ex. 38 | Ex. 39 | Ex. 40 | Comp. Ex. 17 |
| formulation | (A) PPE (pbw) | 45 | 45 | 45 | 45 | 45 |
| | (B) polyamide (pbw) | 45 | 45 | 45 | 45 | 45 |
| | (a) hydrogenated block copolymer (pbw) | 5 | 7 | 3 | 10 | 0 |
| | (D) modified block copolymer (pbw) | 2.5 | 2.5 | 2.5 | 2.5 | 2.5 |
| | (β) diene block copolymer (pbw) | 5 | 3 | 7 | 0 | 10 |
| dispersion morphology | continuous phase | polyamide | polyamide | polyamide | polyamide | polyamide |
| | dispersed phase | PPE + HTR | PPE + HTR | PPE + HTR | PPE + HTR | PPE + HTR |
| | dispersion morphology of components (a) and (β) | dispersed in PPE phase | dispersed in PPE phase | dispersed in PPE phase | dispersed in PPE phase | dispersed in PPE phase |
| particle size of PPE (μm) | | 1.8 | 1.8 | 1.5 | 1.5 | 2.0 |
| properties | Izod 23° C. impact (kg · cm/cm) strength | 43 | 43 | 43 | 45 | 40 |
| | flexural modulus of elasticity (kg/cm²) | 22,000 | 22,500 | 22,500 | 22,500 | 21,500 |
| | heat distortion | 135 | 135 | 135 | 135 | 135 |

TABLE 9-continued

| | | | | | |
|---|---|---|---|---|---|
| temperature (°C.) | | | | | |
| thermal stability (%) | 90 | 90 | 85 | 90 | 30 |
| weld-line strength (kg/cm²) | 55 | 47 | 32 | 7 | 60 |

*1) The component (C) of the present invention consists of the components (α) and (β).

Industrial Applicability

The thermoplastic resin composition of the present invention is a thermoplastic resin composition which is improved in moldability, mechanical strength and impact resistance, with respect to which conventional polyamide-polyphenylene resin compositions are poor, and has not only excellent thermal stability but also an excellent balance of heat distortion resistance, impact resistance, oil resistance, stiffness, etc. Therefore, the thermoplastic resin composition of the present invention is suitable, for example, as a material for exterior trims for automobiles such as a hubcap, outside board parts and a spoiler, and for electric and electronic parts such as a connector.

We claim:

1. A thermoplastic resin composition comprising:
   (A) a polyphenylene ether,
   (B) a polyamide, and
   (C) a mixture of a hydrogenated block copolymer (α) with non-hydrogenated a diene block copolymer (β),
   said hydrogenated block copolymer (α) consisting essentially of at least one vinyl aromatic polymer block comprised mainly of vinyl aromatic compound units and at least one olefin polymer block comprised mainly of olefin compound units, said olefin polymer block having an ethylenic unsaturation degree of not greater than 20%,
   said hydrogenated block copolymer (α) having a vinyl aromatic compound content of from 25 to 85% by weight and a number average molecular weight of 45,000 to 300,000, the vinyl aromatic compound content of and the number average molecular weight of said hydrogenated block copolymer (α) satisfying the relationship:

$$M \geq 225,000 - (5,000 \times S)$$

wherein M is the number average molecular weight of the hydrogenated block copolymer (α) and S is the vinyl aromatic compound content of the hydrogenated block copolymer (α),
   said non-hydrogenated diene block copolymer (β) consisting essentially of at least one vinyl aromatic polymer block comprised mainly of vinyl aromatic compound units and at least one diene polymer block comprised mainly of conjugated diene compound units,
   said non-hydrogenated diene block copolymer (β) having a vinyl aromatic compound content of from 25 to 85% by weight,
   said components (A), (B), and (C) being present in amounts of from 25 to 70% by weight, from 25 to 70% by by weight, and from 2 to 25% by weight, respectively, based on the weight of the total components (A), (B) and (C),
   the weight ratio of said non-hydrogenated diene block copolymer (β) to said hydrogenated block copolymer (α) in said mixture of the components (α) and (β) being from 2/8 to 8/2, and
   wherein said polyamide component (B) is present as a continuous phase in which said polyphenylene ether component (A) is dispersed to form a dispersed phase having an average dispersed particle size of from 0.1 to 10μ, and substantially all of said block copolymer component (C) is micro-dispersed in said dispersed phase of the polyphenylene ether component (A).

2. The thermoplastic resin composition according to claim 1, wherein said hydrogenated block copolymer (α) has a vinyl aromatic compound content of from 33 to 60% by weight and a number average molecular weight of from 50,000 to 200,000, and wherein the vinyl aromatic compound content of and the number average molecular weight of said hydrogenated block copolymer (α) satisfy the relationship:

$$M \geq 225,000 - (5,000 \times S)$$

wherein M is the number average molecular weight of the hydrogenated block copolymer (α) and S is the vinyl aromatic compound content of the hydrogenated block copolymer (α).

3. The thermoplastic resin composition according to claim 1, wherein said hydrogenated block copolymer (α) contains, per 100 parts by weight thereof, 10 to 100 parts by weight of at least one rubber softener selected from the group consisting of a paraffin rubber softener, and an aromatic rubber softener.

4. The thermoplastic resin composition according to claim 1, wherein said hydrogenated block copolymer (α) contains, per 100 parts by weight thereof, 10 to 100 parts by weight of a naphthene rubber softener.

5. The thermoplastic resin composition according to claim 1, wherein said dispersed phase of the polyphenylene ether component (A) has an average dispersed particle size of from 0.2 to 5 μm.

6. The thermoplastic resin composition according to claim 1, wherein said polyphenylene ether component (A) is selected from the group consisting of a poly(2,6-dimethyl-1,4-phenylene)ether, a copolymer obtained by copolymerizing 2,6-dimethylphenol with 2,3,6-trimethylphenol and mixtures thereof.

7. The thermoplastic resin composition according to claim 1, wherein said polyamide component (B) is selected from the group consisting of polycapramide; polyhexamethylene adipamide; polyhexamethylene sebacamide; polyhexamethylene dodecamide; polyundecanamide; polydocecanamide; a polyamide obtained by reacting terephthalic acid with hexamethylenediamine; a polyamide obtained by reacting adipic acid with m-xylylenediamine; a semiaromatic polyamide obtained by reacting terephthalic acid, adipic acid and hexamethylenediamine; a copolyamide comprising at least two different polyamide units of said polyamides; and mixtures thereof.

8. The thermoplastic resin composition according to claim 7, wherein said polyamide component (B) is selected from the group consisting of polycapramide; polyhexamethylene adipamide; a semiaromatic polyamide obtained by reacting terephthalic acid, adipic acid and hexamethylenediamine; a copolyamide comprising at least two different polyamide units of said polyamides; and mixtures thereof.

* * * * *